United States Patent [19]

Lokey

[11] 4,026,177
[45] May 31, 1977

[54] ROTARY INSULATED SAW BLADE

[75] Inventor: Robert C. Lokey, Tamal, Calif.

[73] Assignee: Lokey Tool, Inc., San Leandro, Calif.

[22] Filed: July 21, 1976

[21] Appl. No.: 707,358

[52] U.S. Cl. .................................. 83/835; 83/838; 83/676; 83/58; 83/DIG. 1
[51] Int. Cl.² .................. B23B 61/02; B27B 33/08
[58] Field of Search ............. 83/835, 838, 676, 58, 83/DIG. 1

[56] References Cited
UNITED STATES PATENTS

| | | | |
|---|---|---|---|
| 640,279 | 1/1900 | Dickerson | 83/838 |
| 3,306,149 | 2/1967 | John | 83/676 |
| 3,785,230 | 1/1974 | Lokey | 83/58 |

Primary Examiner—Donald R. Schran
Attorney, Agent, or Firm—Blair & Brown

[57] ABSTRACT

An insulated saw blade for use with the automatic safety brake for rotary blade equipment, U.S. Pat. No. 3,785,230, to stabilize the capacitance field produced by the blade. The blade has an inner metallic part which is secured to the arbor of the saw an insulating ring rigidly secured to the inner part and extending completely therearound and an outer metallic ring rigidly secured to the insulating ring and having the saw teeth formed thereon. The insulating ring has a roughened surface on its opposite sides to assist in gripping the brake when applied thereto.

3 Claims, 5 Drawing Figures

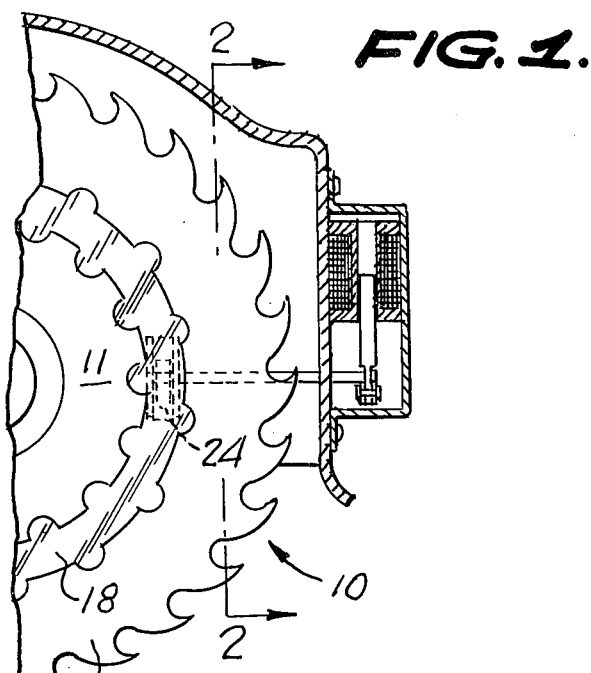
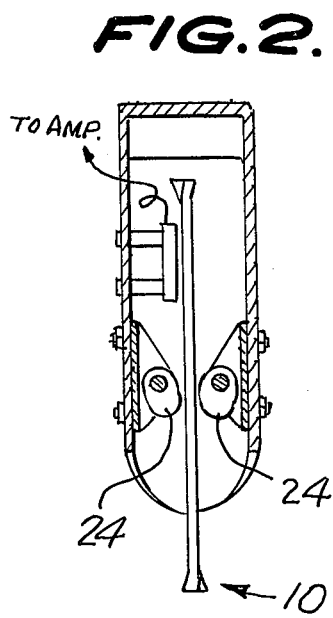
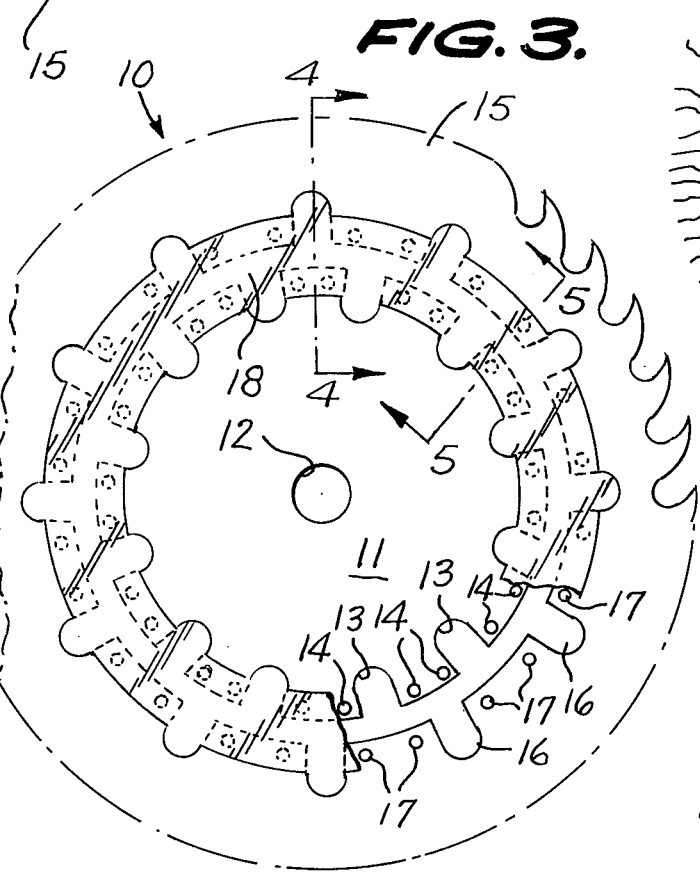
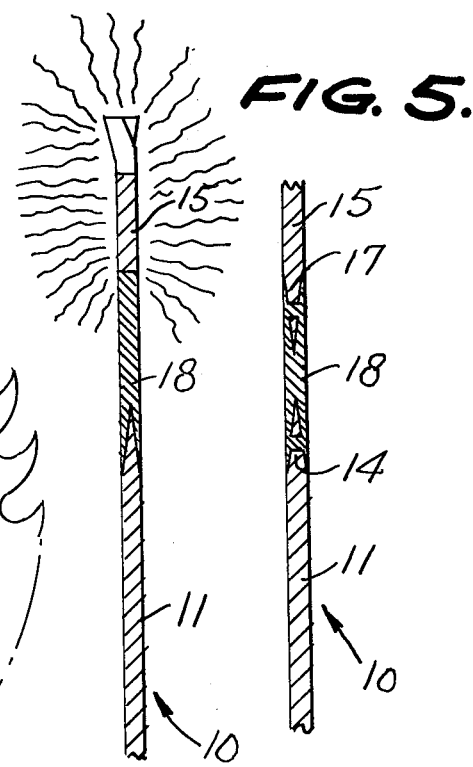

ROTARY INSULATED SAW BLADE

BACKGROUND OF THE INVENTION

FIELD OF THE INVENTION

The present invention is directed to a saw blade having an outer ring insulated from the inner portion to control the capacitance of the blade.

The instant saw blade is used with the automatic safety brake for rotary blade equipment of my earlier issued U.S. Pat. No. 5,785,230 in which a capacitance proximity sensor utilizes the spinning blade as an antenna so that when any portion of the body of the user approaches the blade too closely a cam brake will be instantaneously actuated to stop the rotation of the blade before the body of the user comes in contact with the cutting edge of the blade. In one form of the invention cam members are applied to opposite side faces of the blade to serve as a brake for the instantaneous stopping of the rotation of the blade. The sensitivity of the sensor may be adjusted to suit the capacitance effect of the individual user of the equipment.

The primary object of the invention is to provide a saw blade having controlled capacitance of an outer ring insulated from the inner portion thereof.

Other objects and advantages will become apparent in the following specification when considered in the light of the attached drawings.

BRIEF DESCRIPTION OF THE DRAWINGS

FIG. 1 is a fragmentary elevational view of the saw blade mounted in place with the mounting shown in section;

FIG. 2 is a fragmentary sectional view taken along the line 2-2 of FIG. 1 looking in the direction of the arrows;

FIG. 3 is an elevational view of the blade with a portion of the insulating material broken away for convenience of illustration;

FIG. 4 is a fragmentary sectional view taken along the line 4—4 of FIG. 3 looking in the direction of the arrows illustrating the flux lines of the capacitance field; and FIG. 5 is a sectional view taken along the line 5—5 of FIG. 3 looking in the direction of the arrows.

DESCRIPTION OF THE PREFERRED EMBODIMENT

Referring now to the drawings in detail, wherein like reference characters indicate like parts throughout the several figures, the reference numeral 10 indicates generally a circular saw blade constructed in accordance with the invention.

The circular saw blade 10 includes a central portion 11 having an arbor bore 12 extending through the axial center thereof. The center portion 11 of the blade 10 is provided with a plurality of radially extending U-shaped notches 13 along a periphery thereof. The periphery of the inner portion 11 between the notches 13 is provided with a plurality of bores 14 as can be best seen in FIG. 3. An outer ring 15 surrounds the inner portion 11 and is equally spaced outwardly therefrom. The inner edge of the ring 15 is provided with a plurality of radially extending U-shaped notches 16 as can be best seen in FIG. 3. A plurality of bores 17 are formed along the inner edge of the ring 15 between the U-shaped notches 16. The U-shaped notches 16 are arranged intermediate the U-shaped notches 13 and are equal in number thereto.

A ring of insulating plastic material 18 is molded onto the adjacent edges of the inner portion 11 and outer ring 15 engaging through the bores 14 and 17 and through the U-shaped notches 13 and 16 to rigidly secure the outer ring 15 to the inner portion 11.

It should be noted that the thickness of the inner portion 11 outer ring 15 and insulating ring 18 are identical so that no binding occurs as the saw blade is being used.

The brake pads 24 as seen in FIGS. 1 and 2 are applied to opposite surfaces of the plastic ring 18 which are roughened for cooperation with the brake pads 24. The operation of the saw blade 10 is identical to that of the saw blade 13 in my prior U.S. Pat. No. 3,785,230 with the exception that the conductance only precedes from the outer ring 15 and is much more closely controlled than in the saw blade 13 of my prior Patent.

Having thus described the preferred embodiment of the invention it should be understood that numerous structural modifications and adaptations may be resorted to without departing from the spirit of the invention.

What is claimed is:

1. A saw blade comprising a generally circular inner metallic portion having an axial arbor bore extending therethrough, an outer metallic ring having saw teeth formed thereon spaced outwardly of the outer edge of said inner portion, and a plastic insulating ring rigidly connecting said inner portion and said outer ring.

2. A device as claimed in claim 1 wherein said inner ring is provided with a plurality of radially extending U-shaped notches in the periphery thereof and said outer ring has a plurality of radially extending U-shaped notches in the inner edge thereof with said insulating ring molded into said notches.

3. A device as claimed in claim 2 wherein bores extend transversely through said inner portion and said outer ring between said respective U-shaped notches with said insulating ring molded through said bores.

* * * * *